(12) United States Patent
Bergman et al.

(10) Patent No.: US 8,651,802 B2
(45) Date of Patent: Feb. 18, 2014

(54) COVER PLATE FOR TURBINE VANE ASSEMBLY

(75) Inventors: Russell J. Bergman, Windsor, CT (US);
Joseph W. Bridges, Durham, CT (US);
Kevin R. Richter, North Haven, CT (US)

(73) Assignee: United Technologies Corporation, Hartford, CT (US)

( * ) Notice: Subject to any disclaimer, the term of this patent is extended or adjusted under 35 U.S.C. 154(b) by 1008 days.

(21) Appl. No.: 12/726,021

(22) Filed: Mar. 17, 2010

(65) Prior Publication Data
US 2011/0229305 A1  Sep. 22, 2011

(51) Int. Cl.
*F03B 11/00* (2006.01)

(52) U.S. Cl.
USPC .......................................... 415/115; 415/116

(58) Field of Classification Search
USPC ................ 415/115, 116, 173.1, 173.4, 213.1; 428/131, 577, 578
See application file for complete search history.

(56) References Cited

U.S. PATENT DOCUMENTS

| 6,413,040 | B1* | 7/2002 | Yu et al. ........................ | 415/115 |
| 2005/0013686 | A1* | 1/2005 | Schiavo ........................ | 415/115 |
| 2007/0009349 | A1* | 1/2007 | Ward et al. ................... | 415/115 |
| 2008/0101923 | A1* | 5/2008 | Botrel et al. ............... | 415/173.1 |
| 2008/0118346 | A1* | 5/2008 | Liang ........................... | 415/115 |

* cited by examiner

*Primary Examiner* — Dwayne J White
(74) *Attorney, Agent, or Firm* — Miller, Matthias & Hull LLP

(57) ABSTRACT

Embodiments of a cover plate and material blank for forming the cover plate may include features and characteristics to accommodate tolerance issues in a turbine vane assembly. In one embodiment, the cover plate is formed from a material blank configured to provide the cover plate with a flexible flange area that can be secured to the turbine vane assembly. The flange area may have a range of motion that may be responsive to an installation force, which effectively modifies the configuration of the cover plate to such degree as to seal the cover plate to the turbine vane assembly.

10 Claims, 7 Drawing Sheets

A-A

B-B

C-C

COVER PLATE FOR TURBINE VANE ASSEMBLY

TECHNICAL FIELD

The present disclosure relates generally to turbines and turbine vane assemblies, and particularly, to embodiments of a cover plate that is secured to a pressurized cavity as implemented in the turbine vane assembly.

BACKGROUND

Turbines utilize vanes that extend into the turbine cavity to direct the air as the air flows through the turbine. These vanes must be cooled in order for them to sustain the high temperatures within the turbine environment. The turbine vane assembly, which incorporates the vanes, is constructed to allow cooling fluid, e.g., air, to permeate in, along, and around the vane.

Part of the turbine vane assembly includes a pressurized cavity into which air is forced to facilitate the cooling action mentioned above. A cover plate is implemented as part of this assembly, the cover plate being so constructed to maintain pressure in the cavity as well as to permit air to impinge on various parts of the vane. The cover plate is mounted to portions of the vane assembly that may include cast parts and surfaces onto which the cover plate must seal to maintain pressure in the pressurized cavity.

Some of these portions may have multiple levels that form a well or depression. The cover plate must therefore be designed to not only fit into the well, but also to seal to the surfaces at each of the multiple levels.

SUMMARY

There is described below an embodiment of a cover plate made in accordance with the present disclosure that can mount to the multiple levels of the turbine vane assembly. As discussed in more detail below, this embodiment may include portions that can flex to provide a range of motion. This range can accommodate tolerance issues that can occur by way of the turbine vane assembly, and more particularly, by way of the construction of the multiple levels on which is disposed and sealed the cover plate of the present disclosure.

By way of non-limiting example, there is provided a cover plate for mounting to a mounting area on a turbine vane, the mounting area having a tiered structure including an upper tier and a lower tier. The cover plate may comprise a base level defining a base area having a lower base surface proximate a first attachment surface on the lower tier of the mounting area, and an intermediary portion coupled to the base area. The cover plate may also comprise a flange level formed in peripheral relation to the intermediary portion, the flange level including a flange area including a first flexible wing and a second flexible wing, each of the first flexible wing and the second flexible wing having a lower wing surface proximate a second attachment surface on the upper tier of the mounting area. The cover plate may further comprise a joint extending from the base area to the flange area through the intermediary portion, the joint forming a gap that separates the first flexible wing and the second flexible wing. The cover plate may yet further comprise a weld disposed in the gap with a first end proximate the base area and a second end located a relative distance from an outer edge of the flange area, the relative distance permitting relative movement between the first flexible wing and the second flexible wing.

There is also provided a material blank for bending into a cover plate for a turbine vane. The material blank may comprise a body comprising a upper surface, a lower surface, and a body thickness separating the upper surface and the lower surface. The blank may also comprise a flat pattern disposed in the body, the flat pattern including a peripheral edge defining a working area of the body, the working area including a bending configuration defining a base area, a flange area, and an intermediary portion therebetween, and a joint extending from the peripheral edge toward the working area. The material blank further defined wherein the bending configuration is responsive to bending forces to form a cross-sectional area that has a minimum material thickness no less than about 75% of the nominal body thickness.

BRIEF DESCRIPTION OF THE DRAWINGS

So that the manner in which the above recited features of the present disclosure may be understood in detail, a more particular description is provided by reference to the embodiment, which is illustrated in the accompanying drawings. It is to be noted, however, that the appended drawings illustrate only a typical embodiment of this disclosure and are therefore not to be considered limiting of its scope, for the disclosure may admit to other equally effective embodiments. Moreover, the drawings are not necessarily to scale, emphasis generally being placed upon illustrating the principles of this and other embodiments of the disclosure.

Thus, for further understanding of the concepts of the disclosure, reference may be made to the following detailed description, read in connection with the drawings in which.

DETAILED DESCRIPTION

Illustrated in the appended drawings and discussed below is an embodiment of a cover plate, and corresponding material blank from which the cover plate can be constructed, configured to maintain pressure in a pressurized cavity when secured to portions of a turbine vane assembly. This cover plate is constructed in accordance with various concepts that improve the manufacturability and functionality of cover plates of this type. As discussed in more detail below, such features can be incorporated into cover plates to make them more readily compatible with multi-tier mounting structures found on the turbine vane assembly. This compatibility is facilitated by flexible portions, or flexible wings, that exhibit a range of motion suitable to alleviate tolerance and tolerance stack-up issues common to the surfaces, materials, and construction of the turbine vane assembly. Moreover, the cover plates described and contemplated herein are constructed in a manner that, in addition to addressing issues of dimensional and physical tolerances, provides a robust design that may improve quality and reliability of the resulting cover plate while reducing production costs.

Figure 1:
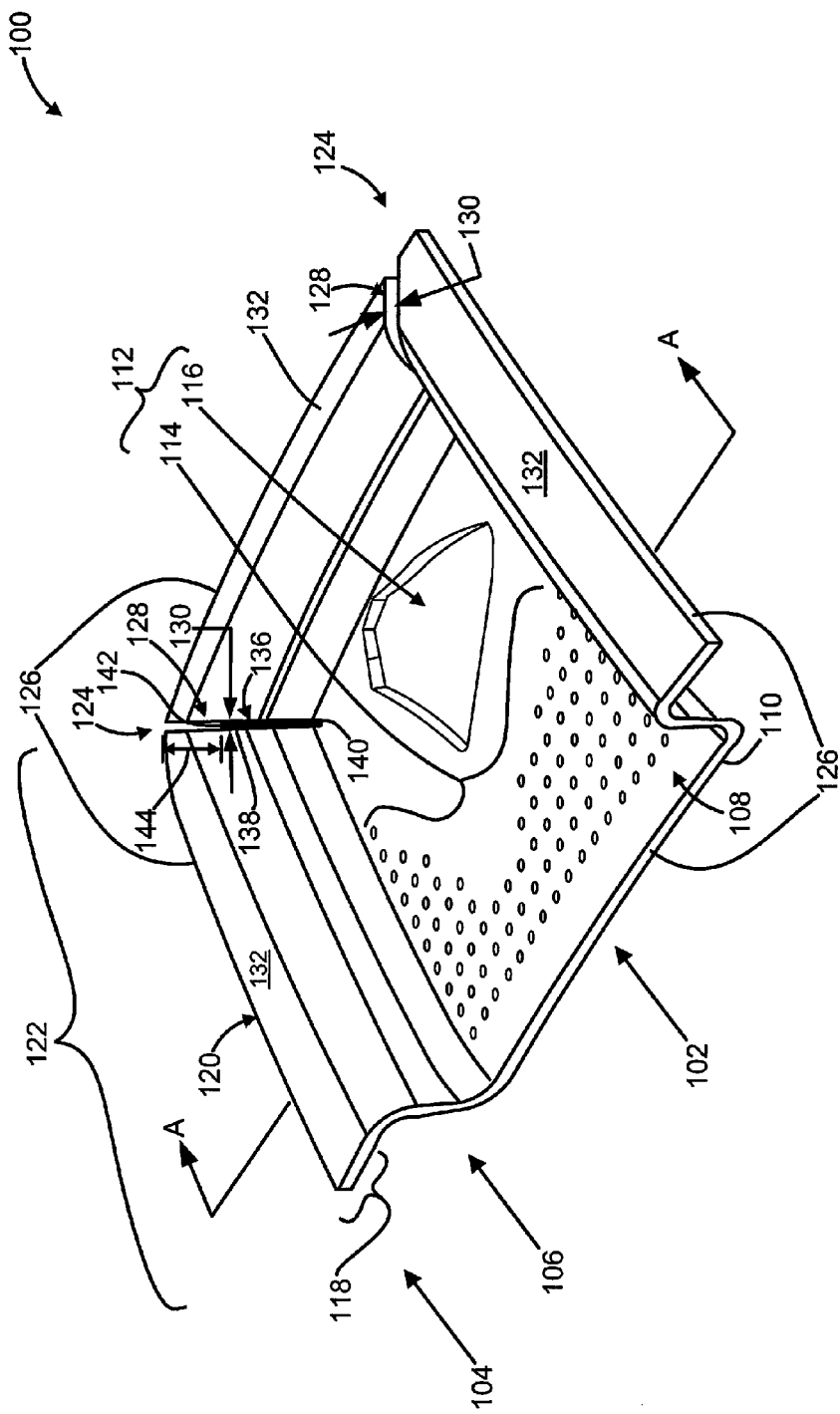
FIG. 1 is a top, perspective view of an exemplary embodiment of a cover plate.
Figure 2:
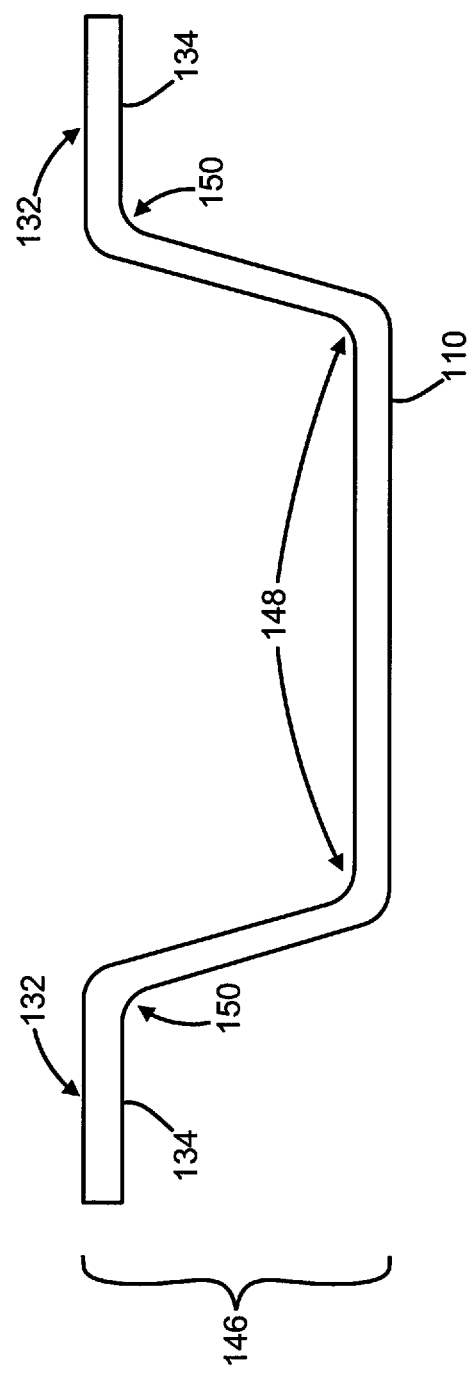
FIG. 2 is a front, cross-section view of the cover plate of FIG. 1.

An exemplary embodiment of a cover plate 100 is depicted in FIGS. 1 and 2 and discussed in detail below. In this example, the cover plate 100 may include a base level 102, a flange level 104, and an intermediary portion 106 that couples the base level 102 and the flange level 104. The base level 102 may include a base area 108 with a lower attachment surface 110, which can interface with portions of the mounting structure of the vane assembly. A plurality of openings 112 may be provided about the base area 108, and in one particular construction the openings 112 may include an array of perforations 114 and a cavity 116 extending through the material of the cover plate 100.

The flange level 104 may include a flange area 118 that has an outer edge 120 that defines an exterior shape 122 of the flange area 118. As depicted in FIG. 1, the exterior shape 122 may have corners 124 and sides 126, which may be substantially parallel to one other as is common for square, rectangle, and similar parallelogram shapes. Each of the corners 124 may include joints 128 that may define gaps 130 in the otherwise contiguous construction of the flange area 118. The gaps 130 may separate the flange area 118 into a plurality of flexible wings 132 that have a lower flange surface 134 that can interface with portions of the mounting structure of the vane assembly. In one embodiment of the cover plate 100, the gaps 130 may extend from the outer edge 120 toward the base level 102 such as through the intermediary portion 106.

The cover plate 100 may also a fastening mechanism 136 such as a weld 138, which may be disposed in or around the gaps 130. Selected mechanisms for the fastening mechanism 136 may be used to seal all or a portion of the joints 128 in order to prevent leakage of fluid through the gaps 130. Welds and weld materials of the type used as the weld 138, for example, are generally recognized by those artisans familiar with turbine systems, and the turbine vane assembly in particular, so additional details are not necessary. The weld 138 in the present embodiment may include a first end 140 proximate the base level 102 and a second end 142 located at a relative distance 144 from the outer edge 120. The relative distance 144 can be selected to permit the range of motion of the flexible wings 132, and more particular to one implementation of the cover plate 100, the relative distance 144 is selected so that the flexible wings 132 can be welded to the mounting structure despite tolerance issues prevalent in the turbine vane assembly.

In one embodiment of the cover plate 100, the intermediary portion 106 may be formed monolithically with one or more of the base level 102 and the flange level 104. This monolithic construction may cause formation in the intermediary portion 106 of a radius formation 146, which in the present example includes an inner bend radius 148 and an outer bend radius 150. Each of the inner bend radius 148 and the outer bend radius 150 can have the same, different, and/or proportional values, with one exemplary embodiment of the cover plate 100 being constructed so that the lower flange surface 134 is substantially parallel to the lower attachment surface 110 before the cover plate 100 is implemented in the turbine vane assembly.

Figure 3:
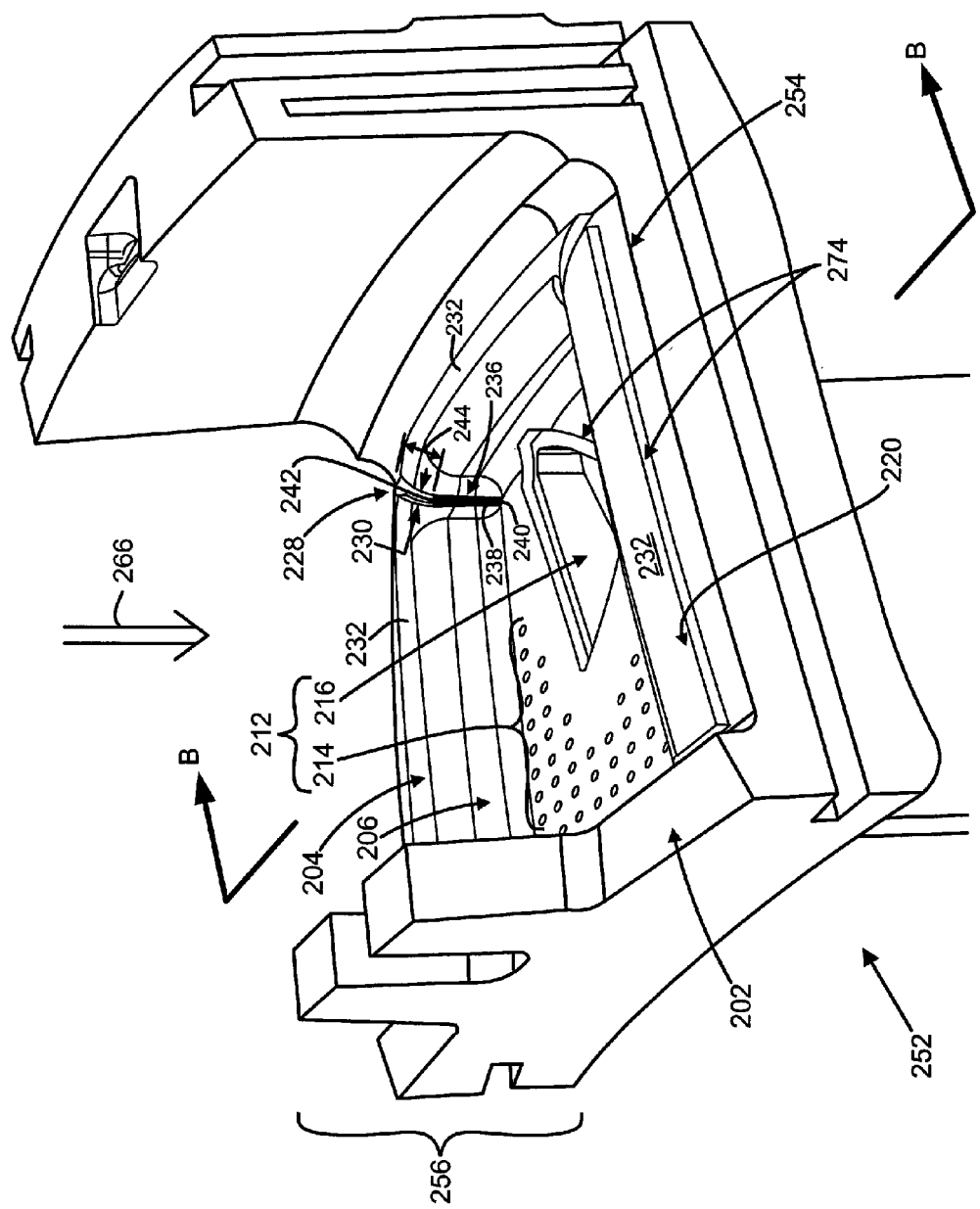
FIG. 3 is a top, perspective view of another exemplary embodiment of a cover plate, which is implemented as part of a turbine vane assembly.
Figure 4:
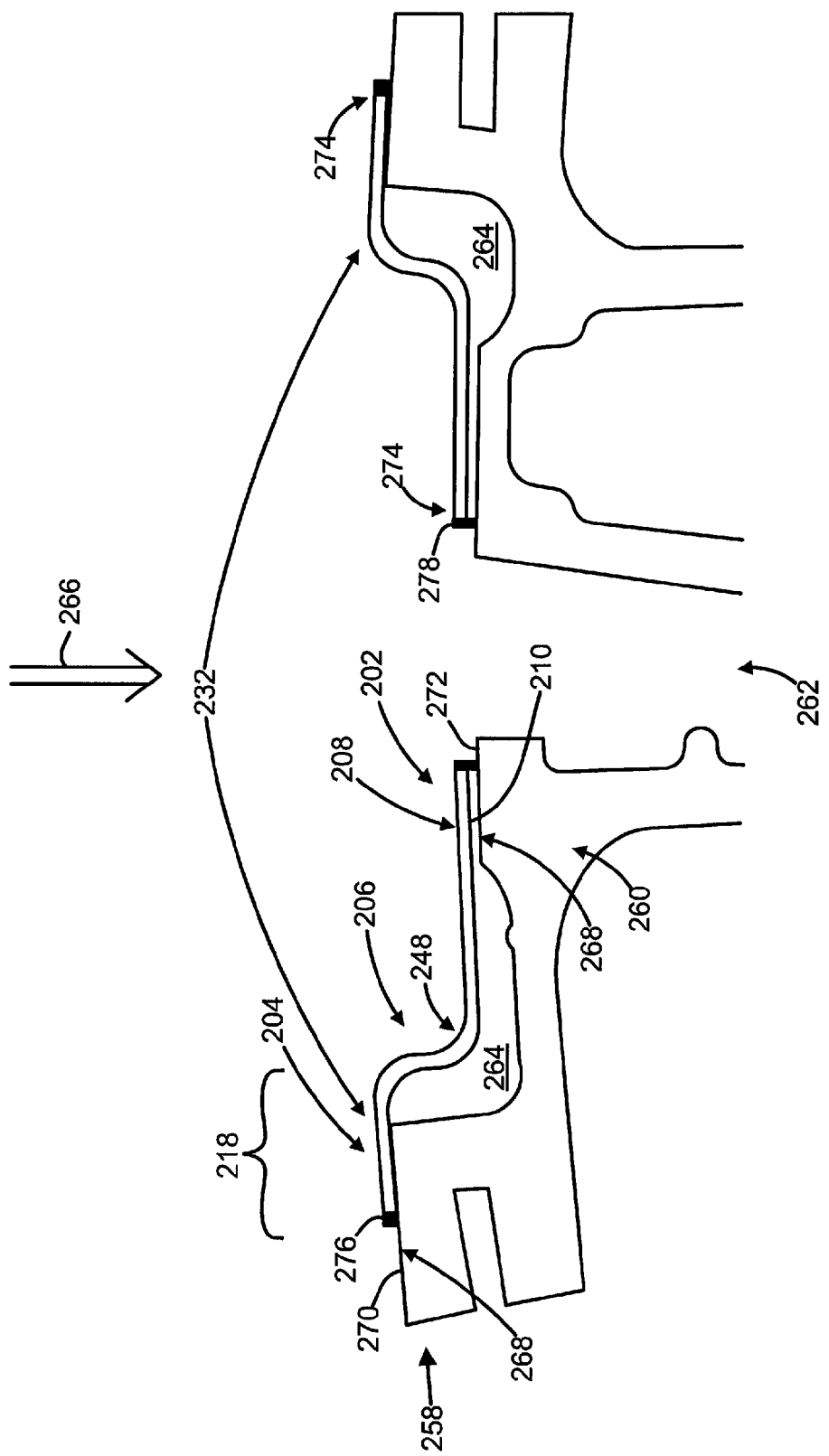
FIG. 4 is a front, cross-section view of the cover plate and turbine vane assembly of FIG. 3.

To further illustrate such implementation, reference can be had to the exemplary embodiment of a cover plate 200 that is illustrated in FIGS. 3 and 4 Like numerals are used to identify like components as between the FIGS. 1-4, but the numerals in FIGS. 3 and 4 are increased by 100 (e.g., 100 is now 200 in FIGS. 3 and 4). For example, there is depicted in FIGS. 3 and 4 a cover plate 200 that may include a base level 202, a flange level 204, and an intermediary portion 206. The cover plate 200 is implemented as part of a turbine vane assembly 252 that may include a mounting structure 254 with a plurality of tiers 256, including in this example an upper tier 258 and a lower tier 260. The turbine vane assembly 252 may also include a central cooling airway 262 and peripheral cooling pockets 264 that are configured to receive pressurized air 266, which is directed through the cover plate 200 in order to cool portions of the turbine vane assembly 252.

As depicted in FIGS. 3 and 4, and particularly in the cross section of FIG. 4, each of the upper tier 258 and the lower tier 260 may include a mounting surface 268 on which is disposed part of the cover plate 200. In one implementation, the mounting surfaces 268 may include an upper tier mounting surface 270 and a lower tier mounting surface 272 for receiving, respectively, the lower flange surface 234 and lower attachment surface 210. A securing weld 274 may be used to fasten the cover plate 200 to the mounting surfaces 268. The securing weld 274 may include an outer securing weld 276, which is constructed about the periphery of the cover plate 200 such about the outer edge 220, and an inner securing weld 278 that may attach portions of the cavity 216 to the lower tier mounting surface 272.

The construction of cover plates such as the cover plate 200 may accommodate tolerance issues that can occur as between, e.g., the upper tier mounting surface 270 and the lower tier mounting surface 272. These tolerance issues may include, for example, surface planarity and flatness, as well as other issues that may result from the manufacturing techniques (e.g., machining and casting) associated with the various parts of the turbine vane assembly 252. In one example, providing the range of motion in the flexible wings 232 permits changes in the cover plate 200 such as changes in the relationship between the lower attachment surface 210 and the lower flange surface 234. Each of the flexible wings 232, for example, may be responsive to an installation force to permit biasing of portions of the cover plate 200 towards (or in greater contact with) the mounting surfaces 268 of the mounting structure 254. After application of the installation force, welding techniques may be utilized such as to apply one or more of the outer securing weld 276 and the inner securing weld 278. These techniques result in the cover plate 200 being properly attached to the mounting structure 254, and in one particular implementation the cover plate 200 is sealed to the mounting structure 254 to minimize leakage of fluids and to maintain pressurization of portions of the turbine vane assembly 252.

Figure 5:
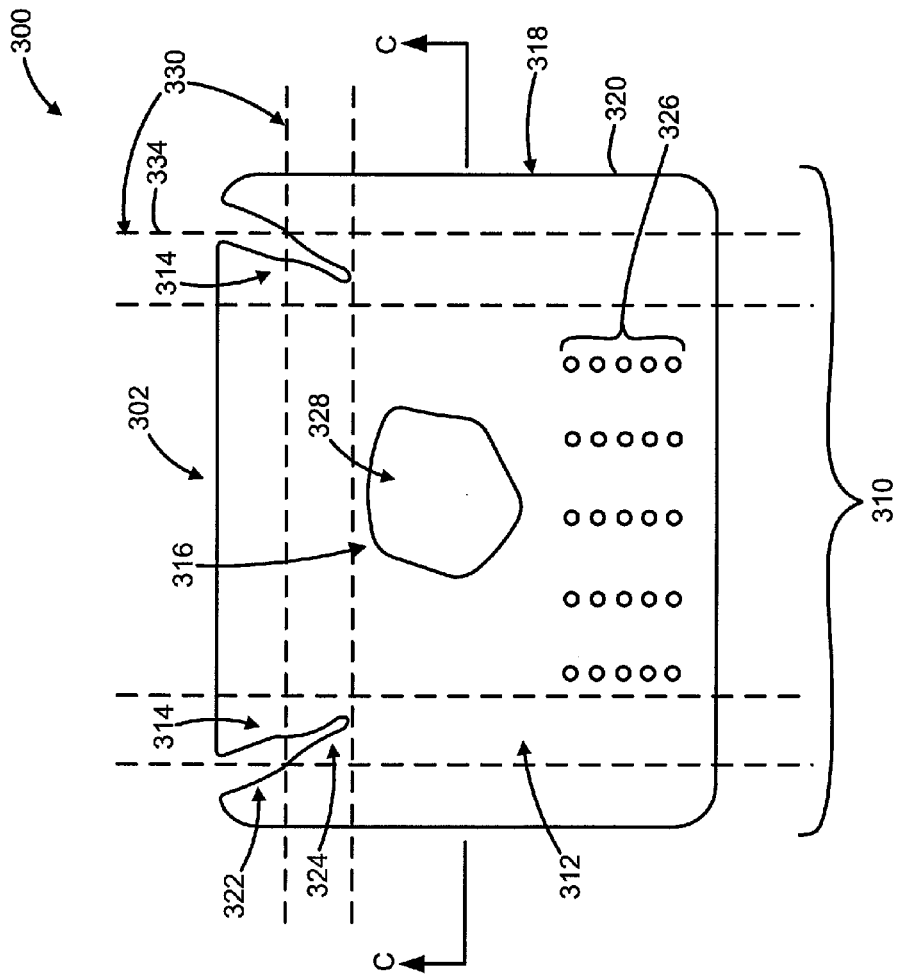
FIG. 5 is a top view of an exemplary embodiment of a material blank that can be formed into a cover plate such as the cover plates illustrated in FIGS. 1-4.
Figure 6:
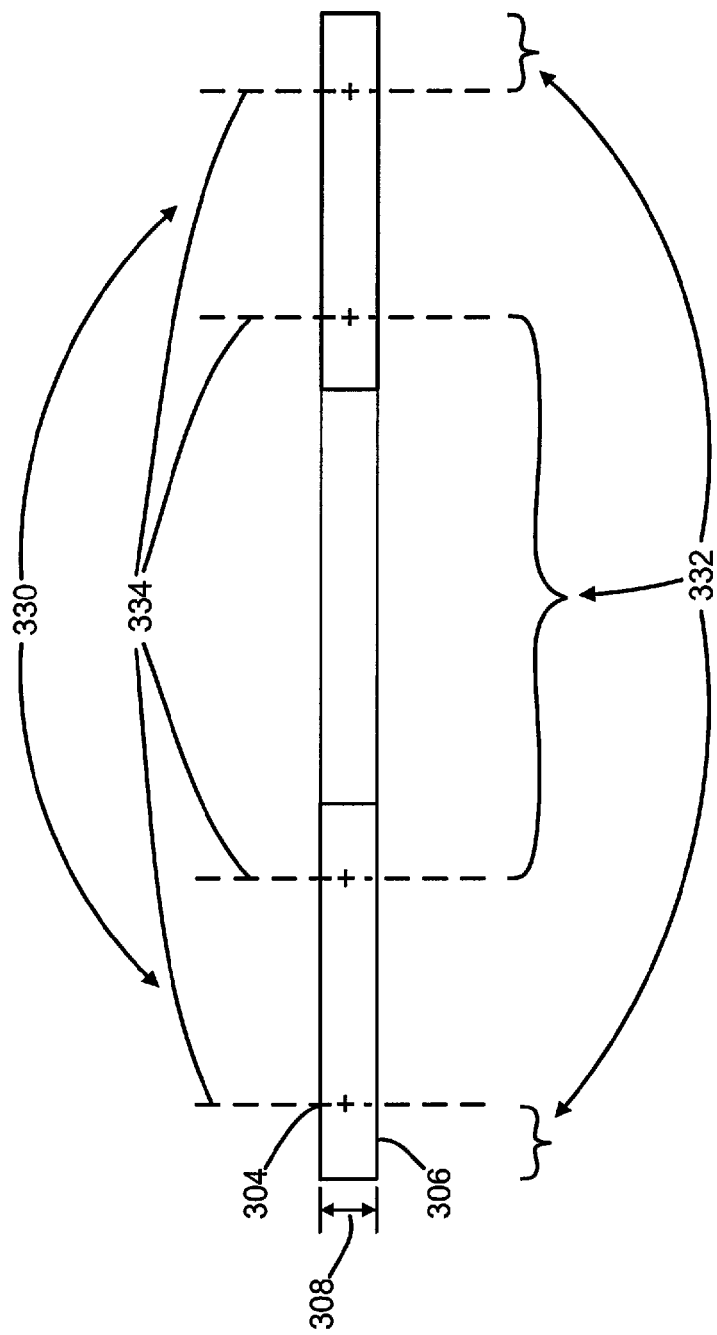
FIG. 6 is a front, cross-section view of the material blank of FIG. 5.

Turning now to FIGS. 5 and 6, there is depicted an exemplary embodiment of a material blank 300 that may be formed into embodiments of the cover plate 100, 200 discussed herein. The material blank 300 may include a body 302 with an upper surface 304 and a lower surface 306 separated by a nominal body thickness 308. The material blank 300 may also include a flat pattern 310, which defines a working area 312 incorporating the various features of the body 302. In the present example, the flat pattern 310 may include cut-outs such as a joint cut-out 314, an opening cut-out 316, and an overall shape cut-out 318 that forms a peripheral edge 320 of the body 302.

Each of the cut-outs can vary as per the desired implementation of the cover plate, as well as in connection with the manipulation of the material blank 300 to form the cover plate contemplated herein. The joint cut-out 314 may, for example, include a peripheral gap opening 322 and an interior gap opening 324, the combination of which may be selected to form the flexible wings (e.g., the flexible wings 132, 232). The opening cut-out 316 may include an array opening 326 and a cavity opening 328 that form the various openings that permit air flow and pressurization through the cover plate and about the turbine vane assembly, some details of which were discussed above.

The flat pattern 310 and/or the material blank 300 generally may also include a bending configuration 330 that can delineate a plurality of levels 332 such as the base level 102, 202 (FIG. 1) and the flange level 104, 204 (FIG. 1), as well as the intermediary portion 106, 206 (FIG. 1) of the cover plate 100 and 200 above. The bending configuration 330 may include bend lines 334 distributed variously thereon and about which the material blank 300 is manipulated to form one or more portions of the resulting cover plate. This manipulation can occur as part of certain bending processes, which can apply bending forces selectively about the parts of the material blank 300, the flat pattern 310, and the bending configuration 330. These processes can utilize various machinery and equipment including breaks, presses, dies, and similar sheet metal working implements, the application and operation of which is generally understood by those artisans skilled in the relevant manufacturing arts and familiar with turbine and turbine vane assembly.

Common measurements for the nominal body thickness 308 can be nominally from about 0.25 mm to about 0.5 mm. The value for the nominal body thickness 308 may also be selected in connection with the manufacturing processes utilized to form the material blank into the cover plates. Moreover, materials for the body 302 are selected that are compatible with the bending processes (and bending forces) discussed above. Exemplary materials can comprise various sheet and drawn metals such as, but not limited to, aluminum, stainless steel, steel, as well as the varying compositions and derivations thereof. In one example, the body 302 may comprise at least about 58% nickel.

Materials, dimensions, and overall construction of the material blank 300 may likewise be provided to maintain certain physical characteristics of the material during and after manipulation of, e.g., the bending configuration 330. These physical properties may include, for example, thickness measurements and tolerances for all or part of the material blank 300 and/or the resulting cover plate. The bending configuration 330 in one example is so configured that the cross-sectional area of the cover plate (as observed, e.g., in FIGS. 2 and 4) that results from manipulation of the material blank 300 exhibits a minimum material thickness of at least about 75% of the nominal body thickness 308. In such example, the uniform material thickness takes into consideration compression, shearing, tension, and other material alterations that can occur at the bend lines 334 from the bending processes. This feature is particularly beneficial because cover plates made from examples of the material blank 300 can accommodate mounting structures with greater (e.g., deeper) tiered structures without sacrificing quality, reliability, and cost of manufacturability of the cover plate.

Figure 7:
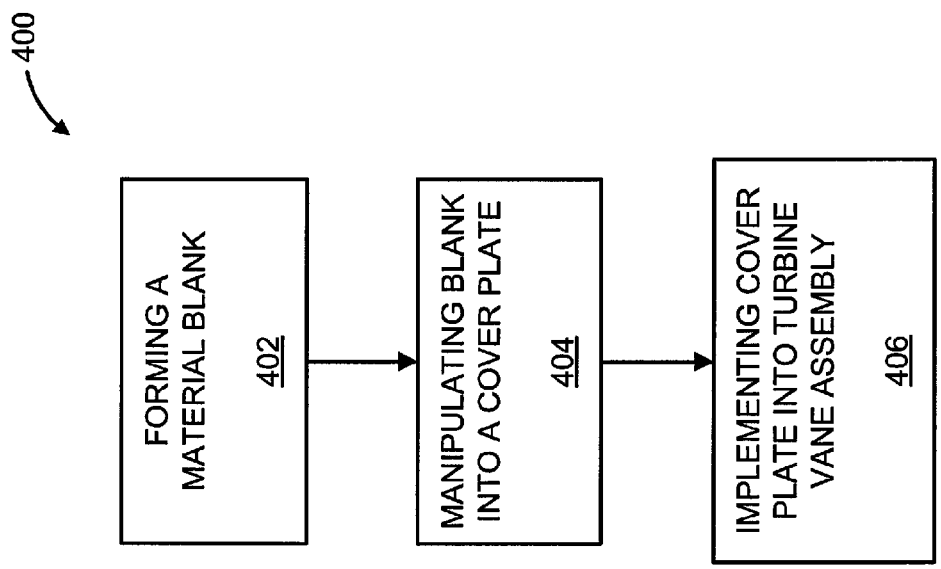
FIG. 7 is a flow diagram of a method for forming a cover plate such as the cover plates of FIGS. 1-4.

For one example of processes and methods for implementing the concepts of the present disclosure reference can now be had to the method 400 of FIG. 7. The method 400 may include steps useful to form the cover plate such as steps that call for application of manufacturing processes described above. The steps may likewise include steps for implementing the cover plate as part of the turbine vane assembly. For example, but not by limitation, in FIG. 7 there is depicted an exemplary embodiment of a method 400 for constructing and implementing a cover plate that is made in accordance with the present disclosure. The method 400 may include variously steps 402-406, the application of which can manipulate raw material into the material blank and then into one or more embodiments of the cover plate discussed above.

As depicted in FIG. 7, the method 400 may include, at step 402, forming a material blank, at step 404, manipulating the material blank 300 into a cover plate 100, 200, and at step 406, implementing the cover plate 100, 200 into a turbine vane assembly 252. Each of the steps 402-406 may further include other steps and process selected to facilitate the concepts of the present disclosure. At a high level, formation of the material blank 300 can include steps for cutting and forming raw sheet metal into the various shapes and formations desired for the cover plate 100, 200. This step may include application of devices and processes to form the flat pattern such as by cutting with laser or water-jet or by stamping the openings 112, 212 and cavities (e.g., cavity 116, 216) that permit air to flow through the cover plate 100, 200.

Manipulation of the material blank 300 can include applying such forces that cause bending of the material about, e.g., the bend lines 334 of the bending configuration 330. The amount of force as well as the various tools and dies used to bend the material may vary as per the material thickness (e.g., the nominal body thickness 308) and composition, as well as in connection with the size of the bend radiuses (e.g., radiuses 148, 150 (FIG. 1) desired. Moreover, while discussed primarily in context of bending a monolithic material structure, there is also contemplated manipulation of the material blank 300 in which portions are fastened together such as by welding separate pieces together to form one or more of the base level 102, 202, the flange level 104, 204, and the intermediary portion 106, 206 of the cover plate 100, 200.

Implementing the cover plate 100, 200 may include such steps consistent with construction of a turbine and/or the turbine vane assembly 252. Techniques for fitting and modifying the cover plate 100, 200 may be included so that the cover plate 100, 200 can be sized and configured to accommodate the relative dimensions of, e.g., the mounting structure 254. Cutting and bending processes, for example, may be included herein to modify the cover plate 100, 200 for better fit and function. Welding and other fastening techniques are likewise contemplated as being useful to implement the cover plate 100, 200 in its position as part of the turbine vane assembly 252.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values may include the actual value that is expressly stated, as well as other values that are, or may be, the decimal, fractional, or other multiple of the actual value indicated, and/or described in the disclosure.

While the concepts above have particularly shown and described with reference to at least one exemplary embodiment, it will be understood by one skilled in the art that various changes in detail may be effected therein without departing from the spirit and scope of the disclosure as defined by claims that may be supported by the written description and drawings. Further, where exemplary embodiments are described with reference to a certain number of elements it will be understood that the exemplary embodiments may be practiced utilizing either less than or more than the certain number of elements.

What is claimed is:

1. A cover plate for mounting to a mounting area on a turbine vane, the mounting structure having a plurality of tiers including an upper tier and a lower tier, said cover plate comprising:

a base level defining a base area having a lower attachment surface proximate a first mounting surface on the lower tier of the mounting structure;

an intermediary portion coupled to the base level;

a flange level formed in peripheral relation to the intermediary portion, the flange level including a flange area including a first flexible wing and a second flexible wing, each of the first flexible wing and the second flexible wing having a lower flange surface proximate a second mounting surface on the upper tier of the mounting structure;

a joint extending from the base area to the flange are through the intermediary portion, the joint forming a gap that separates the first flexible wing and the second flexible wing; and a weld disposed in the gap with a first end proximate the base area and a second end located a relative distance from an outer edge of the flange area, the relative distance permitting relative movement between the first flexible wing and the second flexible wing.

2. A cover plate according to claim 1, further comprising an array of perforations disposed in the base area, wherein the perforations permit air to flow through the base area and impinge on portions of the vane proximate the mounting structure.

3. A cover plate according to claim 1, further comprising a cavity disposed in the base area, wherein the cavity consumes at least about 22% of the base area.

4. A cover plate according to claim 1, wherein the intermediary portion is formed unitarily with each of the base level and the flange level.

5. A cover plate according to claim 1, wherein the base area, the intermediary portion, and the flange area are formed from a flat pattern formed in a material blank.

6. A cover plate according to claim 5, wherein the material blank comprises at least about 58% nickel.

7. A cover plate according to claim 5, wherein the base area, the intermediary portion, and the flange area form a cross-sectional area that has a minimum material thickness no less than about 75% of a nominal material thickness of the material blank.

8. A cover plate according to claim 1, wherein the intermediary portion comprises an inner bend radius proximate the base area and an outer bend radius proximate the flange area.

9. A cover plate according to claim 8, wherein the inner bend radius is about the same as the outer bend radius.

10. A cover plate according to claim 8, wherein the lower attachment surface is substantially parallel to the lower flange surface.

* * * * *